(12) United States Patent
Yasui et al.

(10) Patent No.: US 6,309,021 B1
(45) Date of Patent: Oct. 30, 2001

(54) MOVEMENT DEVICE FOR AUTOMOBILE SEAT AND AUTOMOBILE SEAT

(75) Inventors: Hiroyuki Yasui; Kouji Moro, both of Kanagawa-ken (JP)

(73) Assignees: Ikeda Bussan Co., Ltd.; Nissan Motor Co., Ltd., both of Kanagawa-ken (JP)

( * ) Notice: Subject to any disclaimer, the term of this patent is extended or adjusted under 35 U.S.C. 154(b) by 0 days.

(21) Appl. No.: 09/461,339

(22) Filed: Dec. 15, 1999

(30) Foreign Application Priority Data

Dec. 18, 1998 (JP) .................................................. 10-361166

(51) Int. Cl.⁷ ........................................................ A47C 1/02
(52) U.S. Cl. ......................................... 297/344.1; 248/429
(58) Field of Search ................................ 297/337, 344.1, 297/340, 330; 248/424, 429

(56) References Cited

U.S. PATENT DOCUMENTS

| | | | |
|---|---|---|---|
| 4,645,159 | * | 2/1987 | Terada et al. ......................... 248/429 |
| 4,721,337 | * | 1/1988 | Tomita .................................. 248/429 |
| 5,048,786 | * | 9/1991 | Tanaka et al. ........................ 248/429 |
| 5,125,611 | * | 6/1992 | Cox ....................................... 248/429 |
| 5,150,872 | * | 9/1992 | Isomura ................................ 248/429 |
| 5,765,798 | * | 6/1998 | Isomura ........................... 248/429 X |
| 5,823,499 | * | 10/1998 | Ito et al. .............................. 248/429 |

FOREIGN PATENT DOCUMENTS 4-96541   8/1992  (JP) .

* cited by examiner

Primary Examiner—Peter M. Cuomo
Assistant Examiner—Stephen Vu
(74) Attorney, Agent, or Firm—Nath & Associates PLLC; Gary M. Nath; Marvin C. Berkowitz

(57) ABSTRACT

A first rail is fixed on a side of a seat and is moved relative to a second rail fixed on a side of a vehicle body. A driving mechanism is to move the first rail relative to the second rail and has a lead screw. The lead screw is supported on the side of the first rail and has an end surface. A bracket is fixed to the first rail and is arranged to be opposed to an end surface of the lead screw.

10 Claims, 4 Drawing Sheets

MOVEMENT DEVICE FOR AUTOMOBILE SEAT AND AUTOMOBILE SEAT

BACKGROUND OF THE INVENTION

1. Field of the Invention

The present invention relates to an automobile seat, and more particularly, to an automobile seat capable of moving in forward and backward directions.

2. Description of Relevant Art

In a conventional power seat structure, movable rails fixed to a seat are engaged with stationary rails fixed to a vehicle body such that the movable rails can move forward and backward, lead screws provided along the movable rails are threaded in nuts mounted to the stationary rails, a rotational force of a motor is transmitted to a front end of each of the lead screws through a gear unit supported on the side of the movable rail, and the movable rail is moved forward and backward together with the seat by rotating the lead screw with respect to the nut (Japanese Utility Model Application Laid-open No. H4-96541 discloses similar technique).

When an excessive forward load is applied to the seat, the load is first applied from the movable rails to the gear units provided at the front ends of the lead screws. The load is transmitted therefrom to the nuts which is fixed to the stationary rails through the lead screws, and the load is received by the nuts.

SUMMARY OF THE INVENTION

However, in this art, since the forward load applied to each of the movable rails is transmitted to the nut only through the backward path from the gear unit to the lead screw, it is necessary to increase the thickness of a panel mounted to the gear unit so that a midpoint of the path should not be damaged. Therefore, the weight and cost of the vehicle are increased.

It is an object of the present invention to provide an automobile seat capable of dispersing a load applied to a movable rail and transmitting the load to the nut.

To achieve the above object, there is provided an automobile seat having a reinforcing structure, having a first rail which is fixed on a side of a seat and which is moved relative to a second rail fixed on a side of a vehicle body; a driving mechanism which is to move the first rail relative to the second rail and has a lead screw. The lead screw is supported on the side of the first rail and has an end surface. Further, the seat has a bracket which is fixed to the first rail and is arranged to be opposed to an end surface of the lead screw.

A first guide member includes a rail and a member fixed with the rail, and a second guide member includes a rail and a member to move with the rail.

Preferably, the seat has a nut which is supported on the side of the second rail and which is screwed to the lead screw.

Preferably, the lead screw has an end, the driving mechanism further has a gear unit which is provided on the end of the lead screw, and a driving source for rotating the lead screw through the gear unit.

Preferably, the bracket and the end surface of the lead screw are opposed to each other at a predetermined distance, and when the first rail is displaced forward by more than a predetermined distance, the bracket abuts against the end surface of the lead screw.

Preferably, the bracket has a base mounted to the first rail, a bottom surface opposed to the end surface of the lead screw, and a flange projecting from the bottom surface toward the lead screw.

Preferably, the flange has a first flange covering a side of the lead screw and a second flange covering another side of the lead screw.

Preferably, a third flange is formed between the first and second flanges, the third flange covers an inner side of the lead screw in a widthwise direction of a vehicle, and the third flange is shorter than a gap between the end surface of the lead screw and the bottom surface of the bracket.

Preferably, the first and second flanges are opposed to each other.

Preferably, the bottom surface has an abutment surface for abutting against the end surface of the lead screw when the first rail is deformed, and a connection surface for connecting the abutment surface and the base to each other. A bead is formed on one of the abutment surface and the connection surface.

Preferably, the first rail is formed with a slit. The base is formed with a bent portion which is bent toward the first rail and inserted into the slit.

Preferably, the automobile seat is applied to a belt-in type.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Preferred embodiments of the present invention will be explained based on FIGS. 1 to 7.

Figure 1:
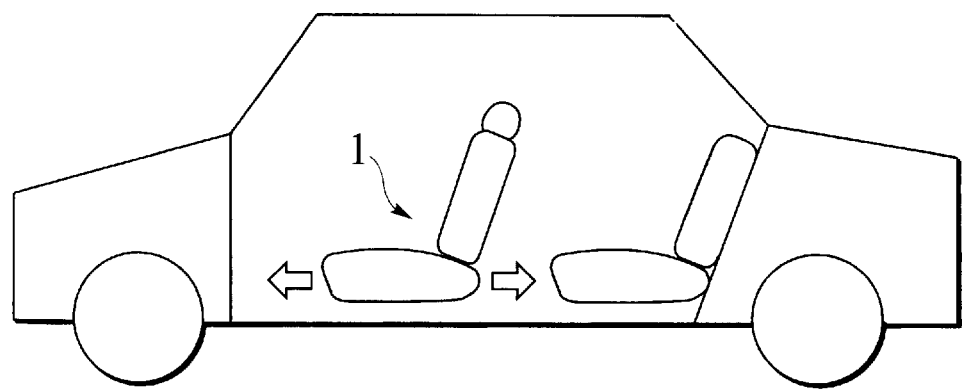
FIG. 1 is a view showing the entire automobile in which a power seat of the present invention is mounted.
Figure 2:
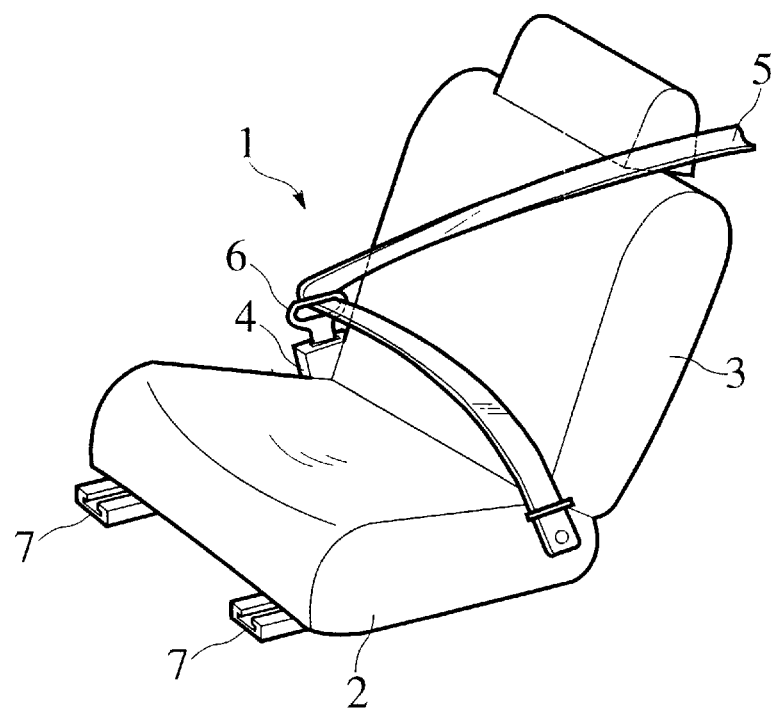
FIG. 2 is a perspective view showing the entire belt in type front seat that is the power seat.

FIG. 1 shows the entire automobile, and a front seat 1 is a power seat which moves forward and backward by a driving force. As shown in FIG. 2, the front seat 1 is of a belt-in type, and has a seat cushion 2 and a seat back 3. A buckle 4 is mounted to an end of the seat cushion 2. A tongue 6 of a seat belt 5 pulled out from a vehicle body side is inserted into the buckle 4 so that a passenger can be restrained and protected.

Figure 3:
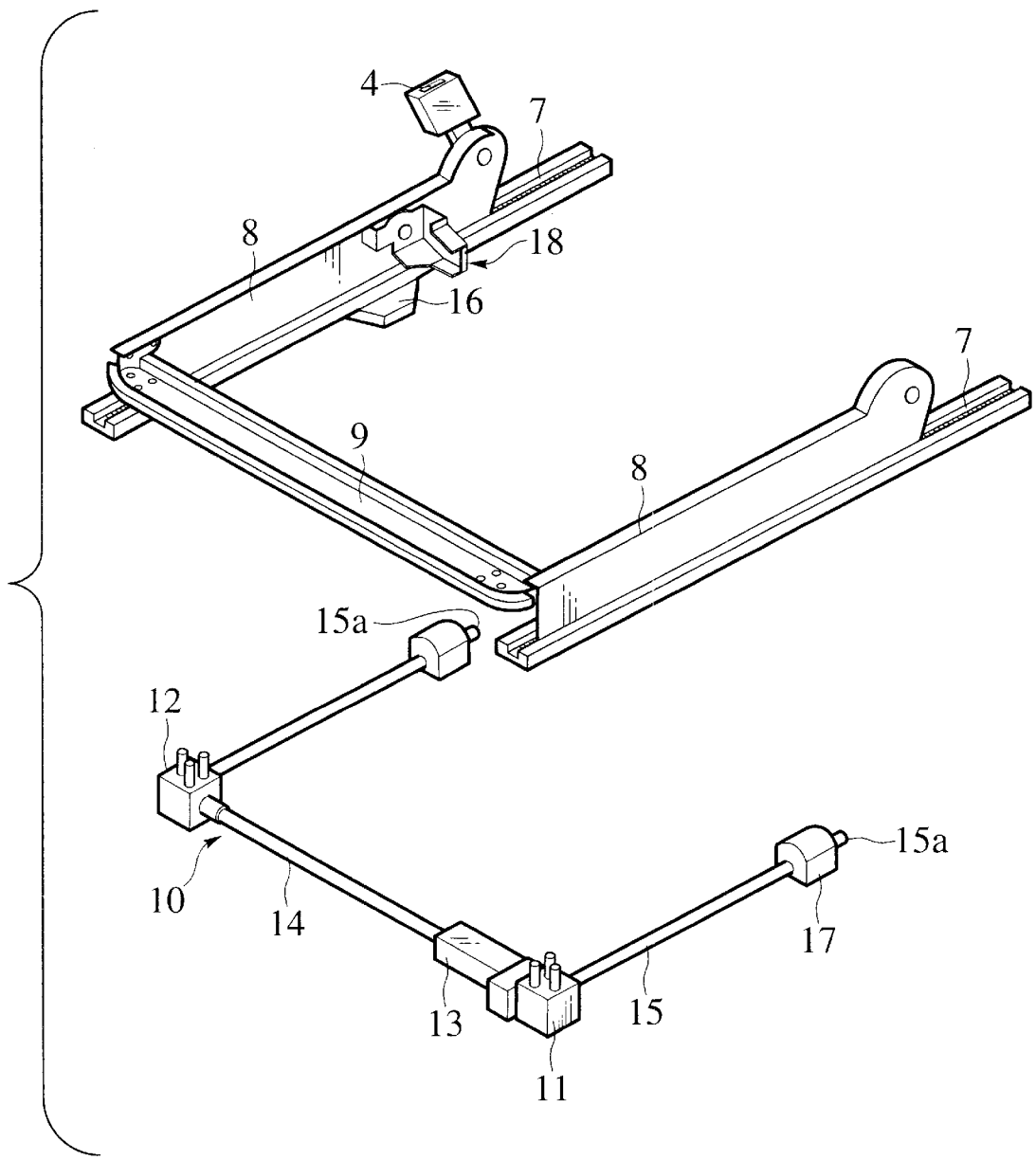
FIG. 3 is an exploded perspective view showing movable rails, stationary rails and a driving mechanism.

The front seat 1, as shown in FIG. 3, can move forward and backward by slidably engaging movable rails 8 fixed to the seat cushion 2 with a stationary rail 7 fixed to the vehicle body. Each of the movable rails 8 has a substantially rectangular cross section whose upper surface is formed with an opening. The cross section of the movable rail 8 has a reversed-T shape. Front ends of the movable rails 8 are connected through a cross member 9 extending along the widthwise direction of the vehicle. The buckle 4 is mounted to a rear end of the left movable rail 8.

A driving mechanism 10 for electrically moving the movable rails 8 forward and backward with respect to the stationary rails 7 is assembled between the movable rails 8 and the stationary rails 7. The driving mechanism 10 has a pair of left and right gear units 11, 12 fixed to the opposite ends of the cross member 9, a motor for generating a rotational force and transmitting the rotational force directly to the left gear unit 11, a shaft 14 for transmitting the rotational force of the motor 13 to the right gear unit 12, lead screws 15 extending rearward from the left and right gear unit 11 and 12, and nuts 17 screwed to the lead screws 15 and fixed to pedestals 16 of the stationary rails 7.

Figure 4:
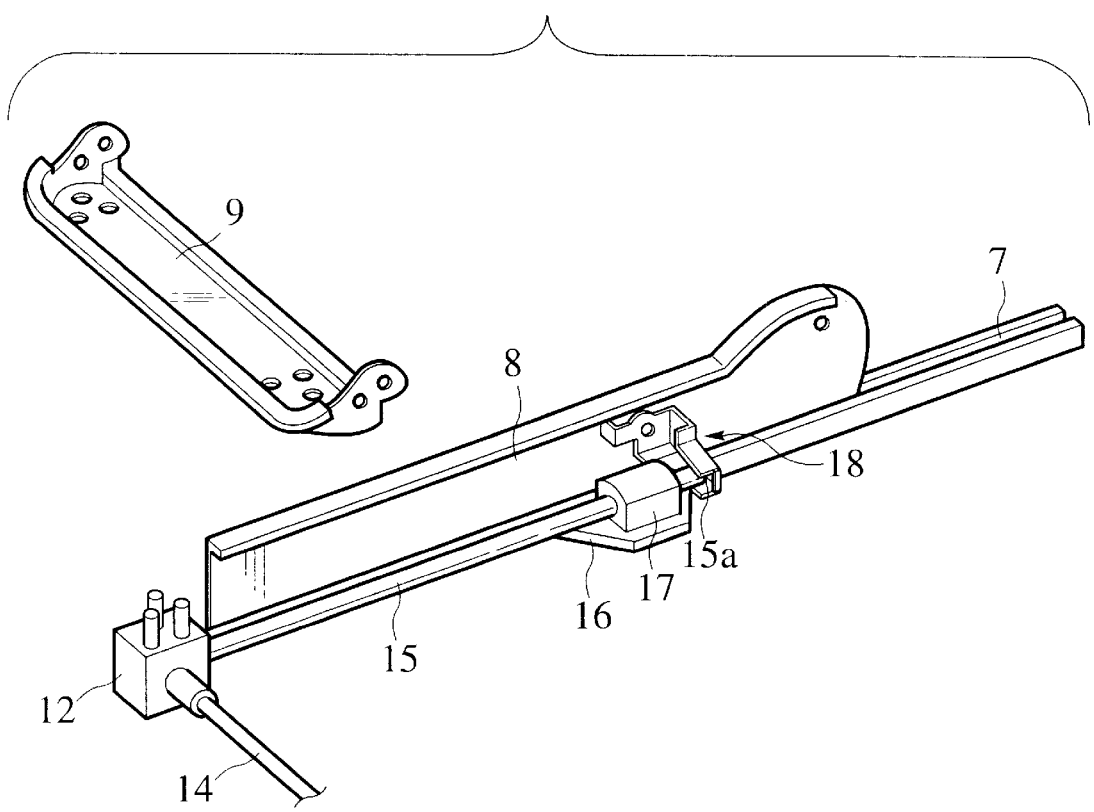
FIG. 4 is an exploded perspective view showing the periphery of the right rail.
Figure 5:
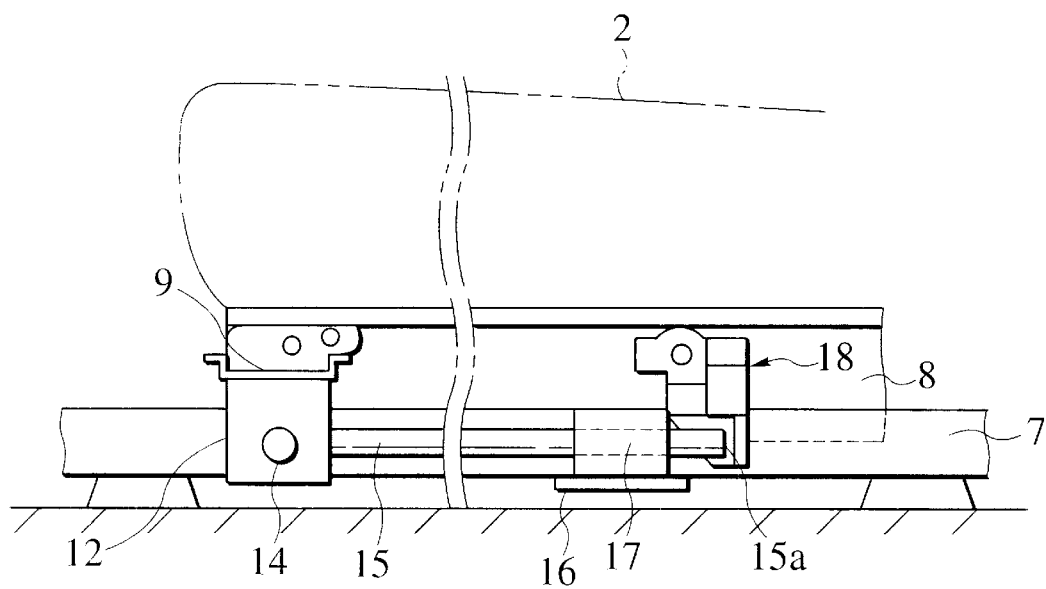
FIG. 5 is a side view showing a state in which the driving mechanism is mounted to the movable rails and the stationary rails.

Each of the lead screws, as shown in FIGS. 4 and 5, is previously screwed to the nut 17 and set from a lower side together with the driving mechanism 10 and then, the rear ends of the lead screws 15 and the nuts 17 are moved outward horizontally, and the nuts 17 are fixed on the pedestals 16. Therefore, by rotating the lead screws 15 by the motor 13, the lead screws 15 are sent with respect to the nuts 17. Therefore, the lead screws 15 move forward or backward together with the movable rails 8 depending upon a rotational direction of the lead screws 15. A switch of the motor 13 is provided in a console (not shown) of the automobile. The driving system may be manual type without using the motor 13.

Brackets 18 are mounted to positions of the left and right movable rails 8 corresponding to the rear ends of the lead screws 15. Although only the right bracket 18 is shown in FIGS. 3 and 4, the bracket 18 is also mounted to the left movable rail 8. The bracket 18 may be mounted to the right movable rail 8 having the buckle 4.

Figure 6:
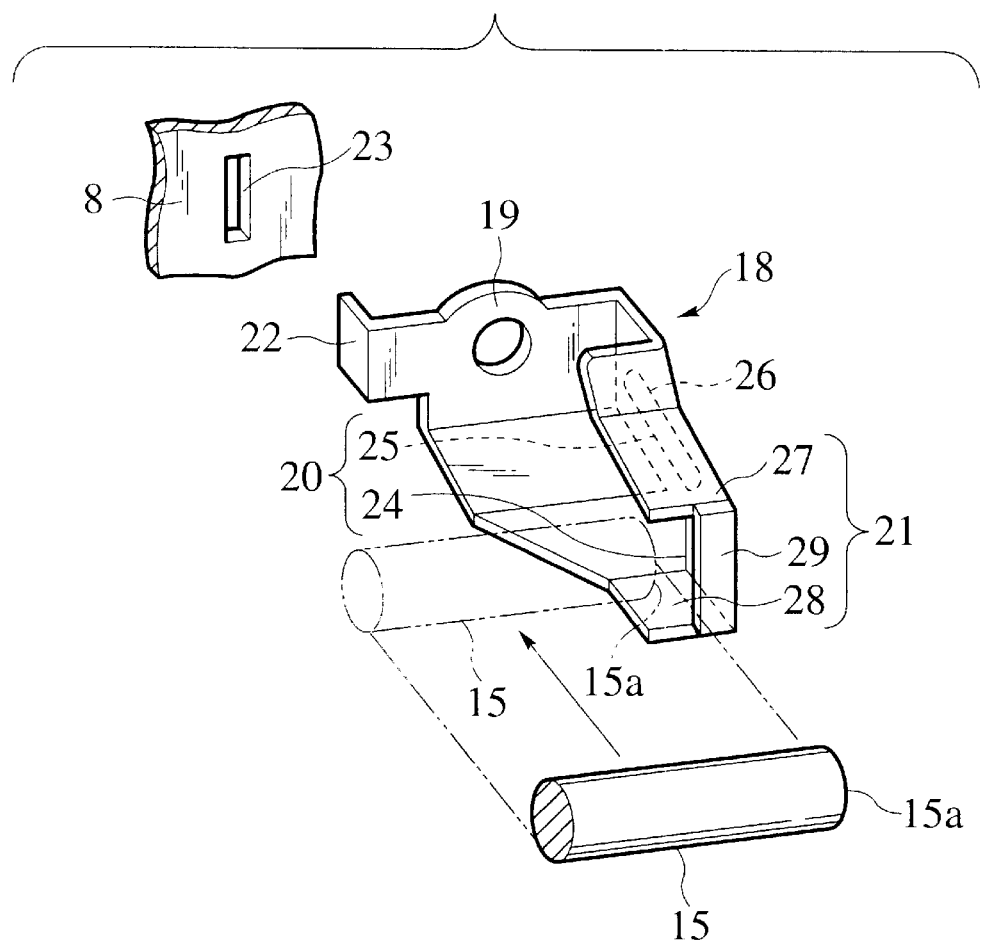
FIG. 6 is an enlarged exploded perspective view showing a bracket.
Figure 7:
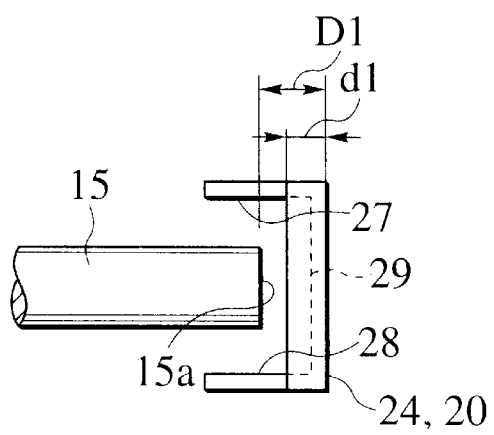
FIG. 7 is a side view showing the bracket.

Each of the brackets 18, as shown in FIG. 6. has a base 19 mounted to the movable rail 8, a bottom surface 20 opposed to a rear end surface 15a of the lead screw 15 at a predetermined distance D1, and a flange 21 projecting in parallel to the axial direction of the lead screw 15 from the bottom surface 20 toward the lead screw 15.

The base 19 is formed at its front end with a bent portion 22. The bent portion 22 is inserted into a slit 23 formed in the movable rail 8. The bottom surface 20 has an abutment surface 24 positioned just behind the lead screw 15 and opposed to the rear end surface 15a through a predetermined distance D1, and a connection surface 25 for connecting the abutment surface 24 and the base 19. The connection surface 25 is formed with a bead 26 projecting rearward for enhancing the rigidity.

Each of the flanges 21 has a pair of upper and lower flanges 27 and 28 covering upper and lower portions of the lead screw 15, and a tip end flange 29 covering an inner side of the lead screw 15 in the widthwise direction of the vehicle between the upper and lower flanges 27 and 28. A length d1 of the tip end flange 29 is set shorter than those of the upper and lower flanges 27 and 28. Since the length d1 of the tip end flange 29 is set smaller than a distance D1 between the abutment surface 24 and the rear end surface 15a, when the lead screw 15 is mounted, the lead screw 15 can be allowed to pass from a space between the upper and lower flanges 27 and 28 and locate in the bracket 18, and thus enhancing the operability. Although this bracket 18 is small in size, the bracket 18 is formed with the flange 21 and the bent portion 22, and its rigidity is high.

Under normal conditions, since the predetermined distance D1 exists between the rear end surface 15a of the lead screw 15 and the bracket 18, the lead screw 15 and bracket 18 do not abut against each other, and no noise is generated.

When a forward load is applied to the movable rails 8 by an inertia force or from the seat belt 5 through the buckle 4 and the rails 8 are displaced forward and upward more than a predetermined level, the abutment surface 24 of the bracket 18 abuts against the rear end surface 15a of the lead screw 15. Therefore, the load is transmitted to the nuts 17 not only through a rearward path in which the load is transmitted to the nuts 17 from the front ends of the lead screws 15 through the gear units 11 and 12 like the prior art, but also through a forward path in which the load is transmitted from the rear end surfaces 15a of the lead screws 15 through the bracket 18.

In this manner, it is possible to transmit the load applied to the movable rails 8 to the nuts 17 while dispersing the load only by adding the small brackets 18. Therefore, it is unnecessary to reinforce the peripheries of the gear units 11 and 12, and to increase the thickness of the lead screws 15 and thus, it is possible to reduce its weight. Further, since the lead screws 15 abut against the brackets 18, it is possible to restrain the movable rail 8 from being deformed and as a result, it is possible to prevent the lead screw 15 from being bent.

Further, since the bracket 18 itself is formed with the flange 21 and the bead 26, even if the bracket 18 abuts against the rear end surface 15a of the lead screw 15, the bracket 18 is less prone to be deformed. Even if the bracket 18 is deformed, since the bracket 18 is formed with the upper and lower flanges 27 and 28 and the tip end flange 29 covering the rear end surface 15a, it is possible to prevent the bracket 18 from deviating or moving from the rear end surface of the lead screw 15, and to keep the abutment state between the rear end surface 15a of the lead screw 15 and the bracket 18. In addition, since the bent portion 22 formed on the base 19 of the bracket 18 is inserted into the slit 23 formed in the movable rail 8, even if the bracket 18 abuts against the rear end surface 15a of the lead screw 15, the bracket 18 does not rotate.

Although the bracket 18 is mounted to each of the left and right movable rail 8 in this embodiment, the bracket 18 may be mounted to only the left movable rail 8 to which the forward load from the seat belt 5 is applied from the buckle 4, and the bracket may be omitted from the right movable rail 8 having no buckle 4.

Although the seat belt is supported by the vehicle body strength member in the above embodiment, the present invention should not be limited to this structure. and the invention can be applied to a seat integrally incorporated into a seat back including a retractor of course.

According to the above embodiment, when the movable rails 8 are displaced or moved forward more than a predetermined level, since the bracket 18 abuts against the rear end surface of the lead screw 15, the forward load applied to the movable rails 8 is transmitted to the nuts 17 not only through the rearward path in which the load is transmitted to the nuts 17 from the front ends of the lead screws 15 through the gear units 11 and 12 like the prior art, but also through the forward path in which the load is transmitted to the nuts 17 from the rear end surfaces 15a of the lead screws 15 by abutment against the bracket 18. In this manner, it is possible to transmit the load applied to the movable rails 8 to the nuts 17 while dispersing the load forward and rearward only by adding the small brackets 18. Therefore, it is unnecessary to reinforce the peripheries of the gear units 11 and 12, and to increase the thickness of the lead screws 15 and thus, it is possible to reduce its weight. Further, since the lead screws 15 abut against the brackets 18, it is possible to restrain the movable rail 8 from being deformed and as a result, it is possible to prevent the lead screw 15 from being bent. Since there exists the predetermined distance between the rear end surface of the lead screw 15 and the bracket 18, the lead screw 15 and the bracket 18 do not abut against each other under normal conditions, and no noise is generated.

Further, since the bracket 18 is provided with the flange 21, it is possible to enhance the rigidity of the bracket 18, and to prevent the bracket 18 from being deformed.

Further, since the upper and lower flanges 27 and 28 covering the rear end surface of the lead screw 15 are formed, it is possible to prevent the bracket 18 from deviating or moving from the rear end surface of the lead screw 15, and to keep the abutment state between the rear end surface 15a of the lead screw 15 and the bottom surface 20 of the bracket 18.

Further, since the tip end flange 29 is formed between the upper and lower flanges 27 and 28, the rigidity of the bracket 18 can be enhanced. Even if the bracket 18 is deformed, it is possible to keep the abutment state between the rear surface of the lead screw 15 and the bracket 18. Further, since the length of the tip end flange 29 is short, it is possible to allow the lead screw 15 to pass from the space between the upper and lower flanges 27 and 28 when the seat is assembled, and the operability can be enhanced.

Further. at least one of the abutment surface 24 and the connection surface 25 is formed with the bead 26, it is possible to further enhance the rigidity of the bracket 18.

Further, since the base 19 of the bracket 18 is formed with the bent portion 22, it is possible to enhance the rigidity of the base 19. Since the bent portion 22 is inserted into the slit 23 formed in the movable rail 8, it is possible to prevent the bracket 18 from rotating.

Further, it is possible to reliably disperse the load applied to the movable rail 8 from the seat belt 5.

The entire content of Japanese patent Application P10-361166 (filed Dec. 15, 1998 ) is incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A movement device for an automobile seat comprising:
   a first guide member supporting a second threaded member;
   a second guide member movable relative to the first guide member;
   a driving mechanism to move the second guide member relative to the first guide member, the driving mechanism having a first threaded member supported by the second guide member, the first threaded member being screwed to the second threaded member, the first threaded member having a first end; and
   a stop member fixed to the second guide member, the stop member being arranged apart from the first end of the first threaded member, facing the first end in an axial direction of the first threaded member,
   wherein when the second guide member is displaced forward by more than a predetermined distance, the first end is abutted on the stop member.

2. The movement device for an automobile seat according to claim 1, wherein
   the first threaded member has a second end, the driving mechanism further comprises a transmitting member provided to the second end of the first threaded member and a driving source for rotating the first threaded member through the transmitting member.

3. The movement device for an automobile seat according to claim 1, wherein
   the stop member comprises a base mounted to the second guide member, a bottom side facing to the first end of the first threaded member, and a flange projecting from the bottom side toward the first threaded member.

4. The movement device for an automobile seat according to claim 3, wherein
   the flange comprises a first flange part covering a side of the first threaded member and a second flange part covering another side of the first threaded member.

5. The movement device for an automobile seat according to claim 4, wherein
   a third flange part is formed between the first and second flange parts, the third flange part covers an inner side of the first threaded member in a widthwise direction of the device, and the third flange part is shorter than a gap between the first end of the first threaded member and the bottom side of the stop member.

6. The movement device for an automobile seat according to claim 4, wherein
   the first and second flange parts face to each other.

7. The movement device for an automobile seat according to claim 3, wherein
   the bottom side has a contact surface for contact with the first end of the first threaded member when the second guide member is deformed; and
   a connection surface for connecting the contact surface and the base to each other, and a bead is formed on one of the contact surface and the connection surface.

8. The movement device for an automobile seat according to claim 3 wherein
   the second guide member is formed with a slit, the base is formed with a bent portion which is bent toward the second guide member and inserted into the slit.

9. An automobile seat comprising:
   a seat;
   a first guide member supporting a second threaded member;
   a second guide member movable relative to the first guide member, the second guide member fixed to the seat;
   a driving mechanism to move the second guide member relative to the first guide member, the driving mechanism having a first threaded member supported by the second guide member, the first threaded member being screwed to the second threaded member, the first threaded member having a first end; and
   a stop member fixed to the second guide member, the stop member being arranged apart from the first end of the first threaded member, facing the first end in an axial direction of the first threaded member,
   wherein when the second guide member is displaced forward by more than a predetermined distance, the first end is abutted on the stop member.

10. The automobile seat according to claim 9, wherein
   the seat has a third end and a fourth end, a seat belt with a tongue is fixed to the third end, and a buckle is fixed to the fourth end for inserting the tongue to be fixed in the buckle.

* * * * *